United States Patent
Eitzinger et al.

(10) Patent No.: US 11,319,999 B2
(45) Date of Patent: May 3, 2022

(54) ASSEMBLY FOR THE SELECTIVE COUPLING OF TWO COAXIALLY ARRANGED SHAFTS

(71) Applicant: MAGNA Powertrain GmbH & Co KG, Lannach (AT)

(72) Inventors: Stefan Eitzinger, Graz (AT); Helmut Schlatzer, Kainach (AT)

(73) Assignee: MAGNA POWERTRAIN GMBH & CO KG, Lannach (AT)

( * ) Notice: Subject to any disclaimer, the term of this patent is extended or adjusted under 35 U.S.C. 154(b) by 0 days.

(21) Appl. No.: 17/096,990

(22) Filed: Nov. 13, 2020

(65) Prior Publication Data
US 2021/0148413 A1 May 20, 2021

(30) Foreign Application Priority Data
Nov. 15, 2019 (DE) .................... 10 2019 217 660.7

(51) Int. Cl.
*F16D 11/14* (2006.01)
*F16D 28/00* (2006.01)
F16D 121/24 (2012.01)

(52) U.S. Cl.
CPC .............. *F16D 11/14* (2013.01); *F16D 28/00* (2013.01); *F16D 2121/24* (2013.01); *F16D 2200/003* (2013.01); *F16D 2200/0021* (2013.01)

(58) Field of Classification Search
CPC ...... F16D 11/14; F16D 28/00; F16D 2121/24; F16D 2200/0021; F16D 2200/003;
(Continued)

(56) References Cited

U.S. PATENT DOCUMENTS

2017/0298997 A1\* 10/2017 Damm .................... B21B 21/00
2019/0017932 A1\* 1/2019 Shiono ................ A61B 5/0059
(Continued)

FOREIGN PATENT DOCUMENTS

CN          104246319 A     12/2014
CN          109578556 A      4/2019
(Continued)

OTHER PUBLICATIONS

Chinese Search Report, CN App. No. 202011268632.8; Nov. 12, 2021; 8 pages.

*Primary Examiner* — David J Hlavka
(74) *Attorney, Agent, or Firm* — Dickinson Wright PLLC

(57) ABSTRACT

An assembly for the selective coupling of two coaxially arranged shafts, comprising a first shaft and a second shaft arranged coaxially, a selector unit for selectively coupling the first shaft to the second shaft and including an electric motor, a selector fork, and a sliding sleeve connected to the selector fork to allow an adjusting action. The first shaft has a first external tooth system, at least in some section or sections, and the second shaft has a second external tooth system, at least in some section or sections. The first external tooth system is in engagement with an internal tooth system of the sliding sleeve and the second external tooth system can be brought into engagement with the internal tooth system of the sliding sleeve. A first tooth system formed on an output shaft of the electric motor is in engagement with a second tooth system of a gear segment, wherein the gear segment is arranged in a fixed manner on the selector fork. The first tooth system and the second tooth system are each designed as a spur gear tooth system.

17 Claims, 8 Drawing Sheets

(58) Field of Classification Search
CPC .... F16D 23/14; F16D 2023/141; F16D 11/10; B60Y 2400/405; B60K 17/22; B60K 17/02
See application file for complete search history.

(56) References Cited

U.S. PATENT DOCUMENTS

2019/0128417 A1* 5/2019 Schulte ................. F16H 63/304
2019/0152316 A1* 5/2019 Wentz .................... F16D 23/12

FOREIGN PATENT DOCUMENTS

| CN | 109838552 A | 6/2019 |
| DE | 102009049013 A1 | 4/2010 |
| DE | 102014217066 A1 | 3/2015 |
| DE | 102014201250 A1 | 7/2015 |
| WO | 2017125135 A1 | 7/2017 |
| WO | 2019148148 A1 | 8/2019 |

* cited by examiner

ASSEMBLY FOR THE SELECTIVE COUPLING OF TWO COAXIALLY ARRANGED SHAFTS

CROSS-REFERENCE TO RELATED APPLICATION

This application claims priority to DE 10 2019 217 660.7, filed Nov. 15, 2019. The entire disclosure of the above application is incorporated herein by reference.

FIELD OF THE INVENTION

The present invention relates to an assembly for the selective coupling of two coaxially arranged shafts, comprising a first shaft and a second shaft, wherein the first shaft and the second shaft are arranged coaxially, and a selector unit for selectively coupling the first shaft and the second shaft, wherein the selector unit has an electric motor, a selector fork and a sliding sleeve, which is connected to the selector fork to allow an adjusting action.

BACKGROUND OF THE INVENTION

This section provides information related to the present disclosure which is not necessarily prior art The prior art has disclosed a large number of concepts for the selective connection of two coaxially arranged shafts. Here, all concepts share a rather complex construction from the actuator, namely an electric motor or an actuating magnet, to the power-transmitting component, namely a sliding sleeve. In most cases, elastic elements, e.g. springs, are required to ensure that ratcheting of the selector tooth system is possible and that there is no damage to the components. The elastic element results, for example, in an additional degree of freedom, and it is not possible to infer the position of the sliding sleeve from the position of the electric motor or the actuating magnet. An additional position sensor is always required for reliable sensing of the position of the sliding sleeve.

SUMMARY OF THE INVENTION

This section provides a general summary of the disclosure, and is not a comprehensive disclosure of its full scope or all of its features It is an object of the invention is to provide an improved assembly for the selective coupling of two coaxially arranged shafts.

The object is achieved by an assembly for the selective coupling of two coaxially arranged shafts, comprising a first shaft and a second shaft, wherein the first shaft and the second shaft are arranged coaxially, and a selector unit for selectively coupling the first shaft to the second shaft, wherein the selector unit has an electric motor, a selector fork and a sliding sleeve, which is connected to the selector fork to allow an adjusting action, wherein the first shaft has a first external tooth system, at least in some section or sections, and the second shaft has a second external tooth system, at least in some section or sections, wherein the first external tooth system is in engagement with an internal tooth system of the sliding sleeve, and the second external tooth system can be brought into engagement with the internal tooth system of the sliding sleeve, wherein formed on an output shaft of the electric motor is a first tooth system, which is in engagement with a second tooth system of a gear segment, wherein the gear segment is arranged in a fixed manner on the selector fork, and wherein the first tooth system and the second tooth system are each designed as a spur gear tooth system.

The assembly according to the invention thus comprises a first shaft, a second shaft arranged coaxially with the first shaft, and a selector unit.

The selector unit is used for the selective coupling of the first shaft to the second shaft. According to the invention, the selector unit has an electric motor, a selector fork and a sliding sleeve connected to the selector fork to allow an adjusting action.

In accordance with the present invention, the first shaft has a first external tooth system, at least in some section or sections, and the second shaft has a second external tooth system, at least in some section or sections. According to the invention, the first external tooth system is in engagement with an internal tooth system of the sliding sleeve, and the second external tooth system can be brought into engagement with the internal tooth system of the sliding sleeve.

Furthermore, in accordance with the present invention, there is formed on an output shaft of the electric motor a first tooth system, which is in engagement with a second tooth system of a gear segment, wherein the gear segment is arranged in a fixed manner on the selector fork. A fixed connection between the selector fork and the gear segment can be accomplished by screw fastening, riveting, adhesive bonding, welding or some other technically common connecting method, for example. A "fixed connection" can also be understood to mean a one-piece embodiment of the selector fork and the gear segment, namely as a structural unit.

According to the invention, the first tooth system on the output shaft of the electric motor and the second tooth system of the gear segment are each designed as a spur gear tooth system.

The invention proposes a very simple actuator system, which transfers the rotary motion of the electric motor to a sliding sleeve as a power-transmitting component by means of just two moving parts, namely a spur-toothed output shaft and a selector fork having a spur gear segment. Here, the spur gear tooth system has the advantage of a very high efficiency. As a result, on the one hand, only a small amount of work is required for actuation and, on the other hand, ratcheting of the selector tooth system, namely of the external tooth systems of the shafts and of the internal tooth system of the sliding sleeve, does not lead to overloading of the selector unit because the electric motor can be reversed. The electric motor thus acts like the spring in the other concepts, wherein the force can be regulated via the motor torque. In addition, there is no additional degree of freedom, and therefore the position of the sliding sleeve can always be determined by way of the rotation angle of the electric motor.

Further developments of the invention are indicated in the dependent claims, the description and the appended drawings.

It is preferable if the adjusting movement of the selector fork for the adjustment of the sliding sleeve is a pivoting movement, and if the adjusting movement of the sliding sleeve for the selective coupling of the first shaft and the second shaft is an axial movement.

The direction indication "axial" describes a direction along or parallel to an axis of rotation of the two shafts.

The direction indication "radial" describes a direction normal to the an axis of rotation of the two shafts.

The selector fork and/or the gear segment are/is preferably manufactured from a metal, e.g. a sintered metal. As a particular preference, the selector fork and/or the gear segment are/is manufactured from aluminium. Through the manufacture of the selector fork and/or of the gear segment from a metal, especially aluminium, the selector fork and/or the gear segment can withstand higher loads.

As an alternative, the selector fork and/or the gear segment are/is preferably manufactured from a plastic or a composite material, e.g. a carbon-fibre-reinforced plastic or a ceramic fibre composite material. Such an embodiment of the selector fork and/or of the gear segment entails a construction which is particularly optimized in terms of weight. Furthermore, the selector fork and/or the gear segment can be produced in a simple and low-cost manner in an injection moulding process. By virtue of the formation of the selector fork, in particular, from plastic, it has a certain flexibility and can bend by about 0.1 mm to 1 mm on the sliding sleeve. In this way, it is possible, by means of a selector fork made of plastic, to obtain a kind of spring which is formed directly by the selector fork itself. In this way, the measurement of the power consumption in the case of a tooth-on-tooth position can be simplified.

The selector fork and the gear segment are preferably embodied in one piece. However, a two-part embodiment is also conceivable.

It is also conceivable, for example, to manufacture the gear segment from metal and to produce the selector fork from plastic in an injection moulding process, wherein a fixed assembly of the gear segment on the selector fork is achieved by inserting the metal gear segment into the injection mould for the selector fork and overmoulding the gear segment with plastic.

The sliding sleeve is preferably produced from a metal, e.g. a sintered metal. The sliding sleeve is preferably manufactured from steel, especially in the case of high load applications. However, production of the sliding sleeve from an alternative material, e.g. a plastic, is also conceivable.

The adjusting movement of the selector fork for the adjustment of the sliding sleeve is preferably a pivoting movement, wherein the pivoting point of the selector fork is radially below the axis of rotation of the shafts. In this way, the forces acting on the selector unit can be reduced.

In an alternative variant embodiment of the assembly according to the invention, the adjusting movement of the selector fork for the adjustment of the sliding sleeve is a pivoting movement, wherein the pivoting point of the selector fork is radially above the axis of rotation of the shafts. In this way, it is possible to obtain an assembly that is particularly optimized in terms of installation space.

The transmission ratio by way of the tooth systems is preferably configured in such a way that the output shaft and hence the electric motor perform a maximum of one revolution to adjust the selector fork and thus the sliding sleeve. In this way, a rotation angle sensor of the electric motor can be used to determine the shift position of the sliding sleeve. There is no need for an additional position sensor.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DESCRIPTION OF THE INVENTION

Figure 1:
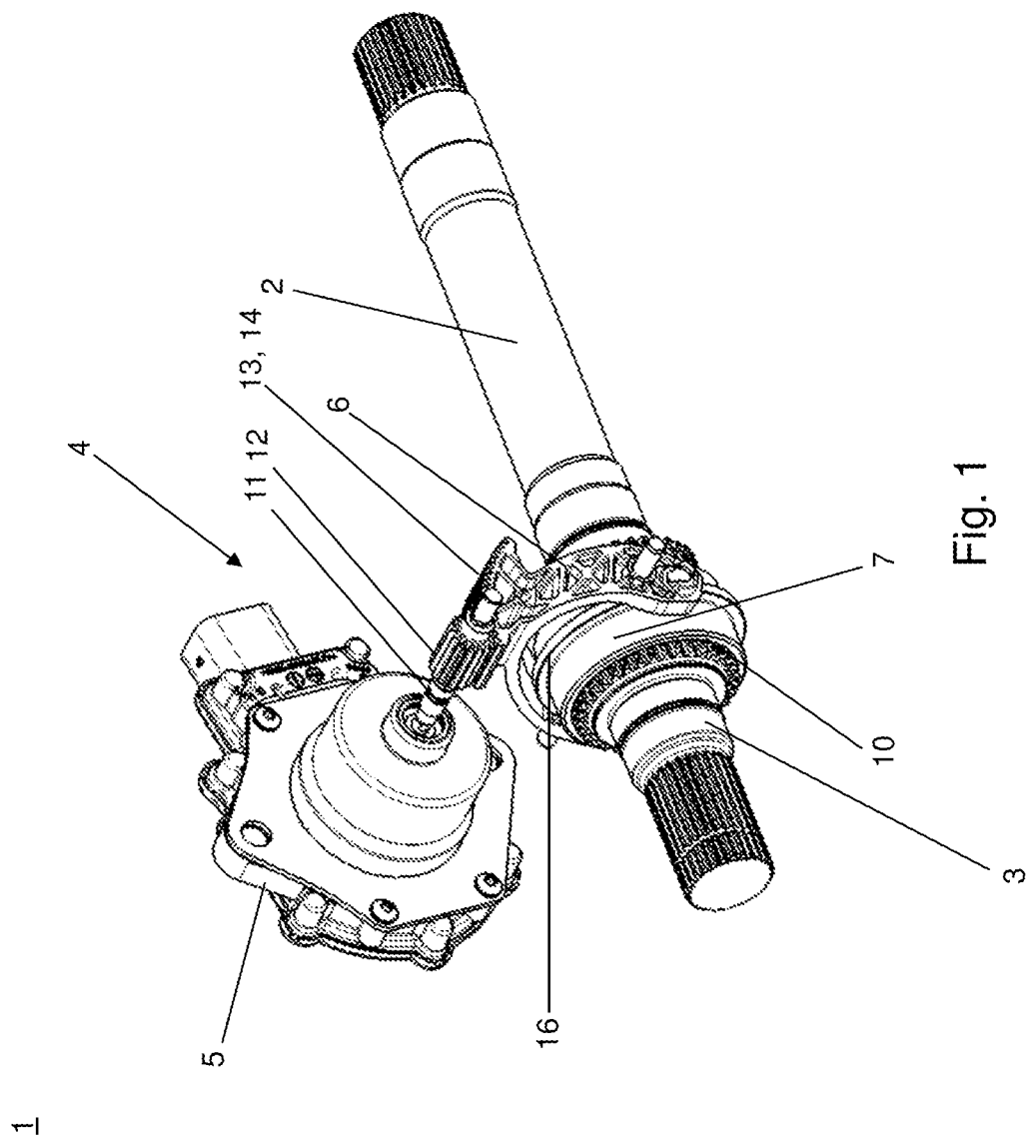
FIG. 1 is a perspective view of an assembly constructed according to the teachings of the invention.

FIG. 1 illustrates an illustrative variant embodiment of an assembly 1 in accordance with the present invention. FIG. 2 to FIG. 8 show different perspectives or parts of this variant embodiment as per FIG. 1.

The assembly 1 comprises a first shaft 2, a second shaft 3, which is arranged coaxially with the first shaft 2, and a selector unit 4.

Figure 2:
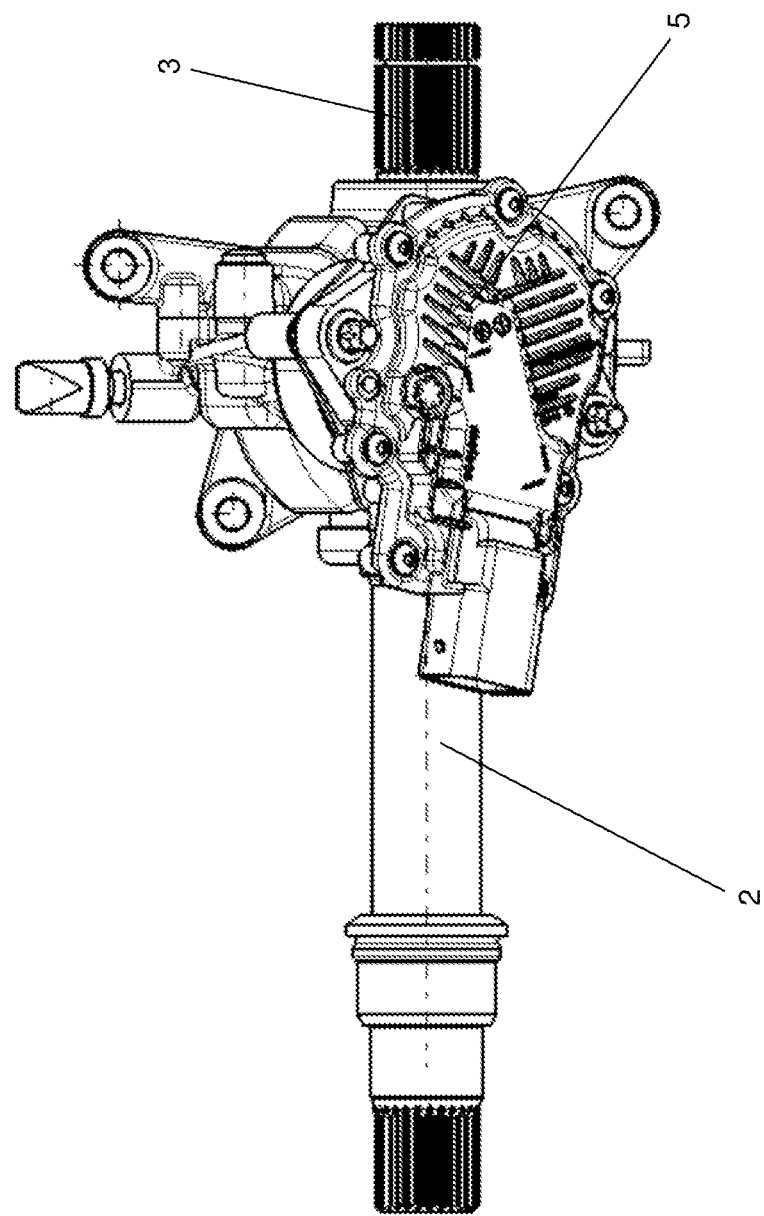
FIG. 2 is another perspective view of the assembly shown in FIG. 1 from a different viewing angle.
Figure 4:
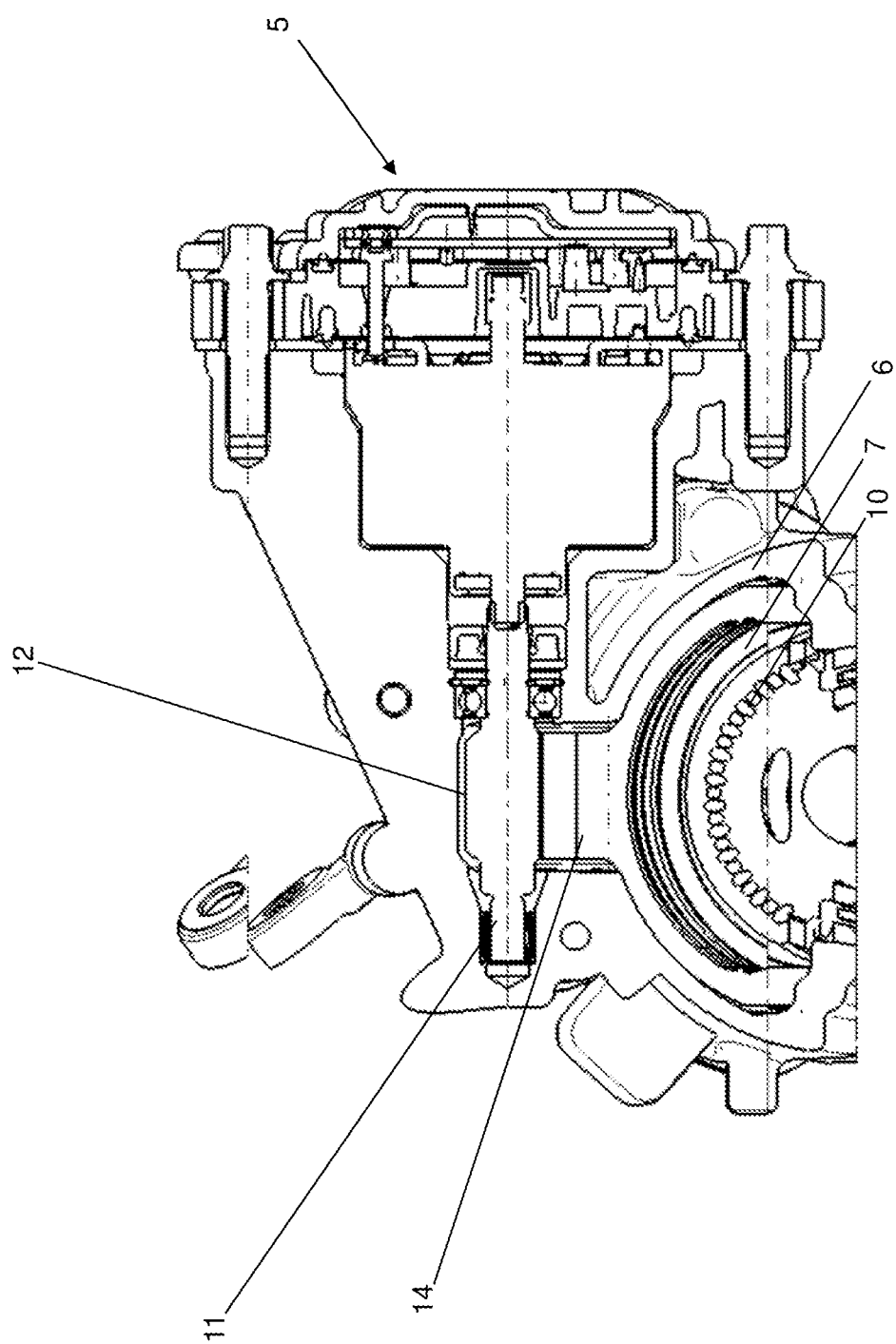
FIG. 4 is another partial sectional illustration of the assembly according to the invention shown in FIG. 1, in particular illustrating an electric motor, an output shaft of the electric motor, and a selector fork.

The selector unit 4 is used for the selective coupling of the first shaft 2 to the second shaft 3. The selector unit 4 has an electric motor 5, a selector fork 6 and a sliding sleeve 7 (FIG. 1, FIG. 2, FIG. 4).

Figure 6:
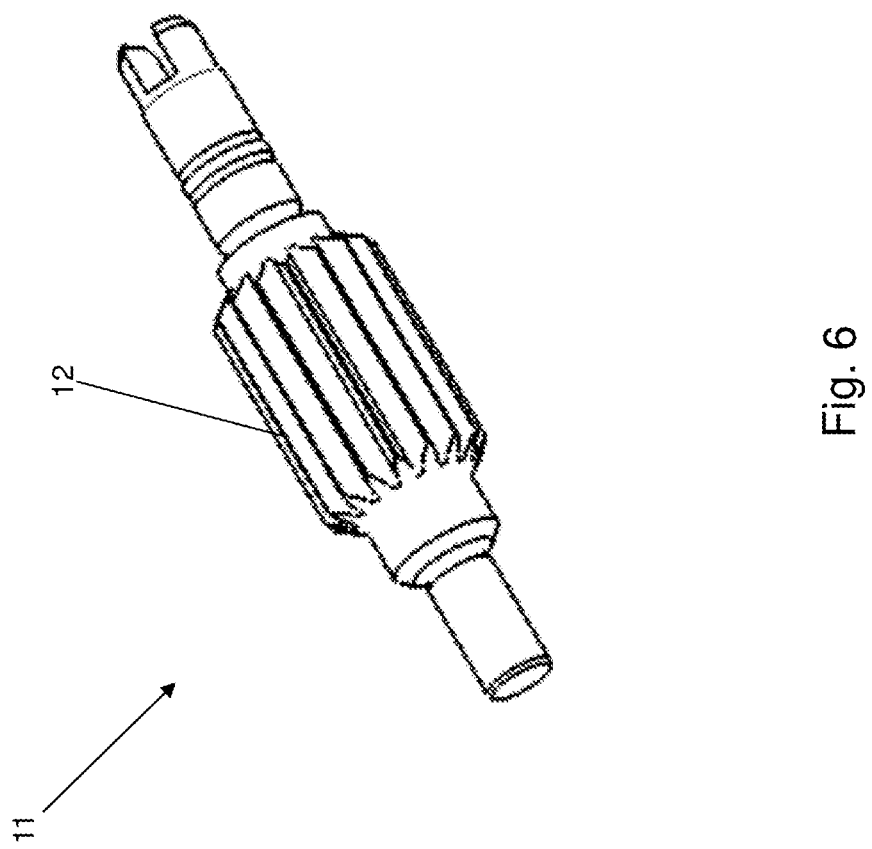
FIG. 6 is a perspective view of the output shaft associated with the electric motor as per FIG. 1.

The electric motor 5 has an output shaft 11. A circumferential first tooth system 12 is formed on some section or sections of the output shaft 11. The first tooth system 12 is embodied as a spur gear tooth system (FIG. 6).

Figure 5:
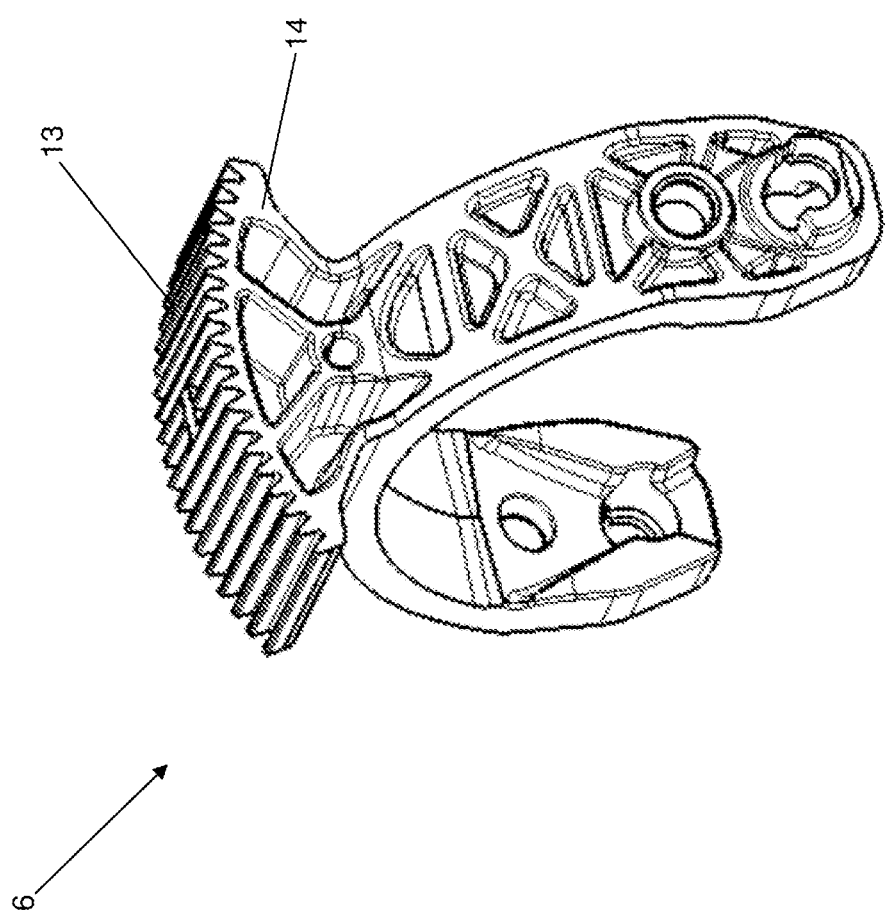
FIG. 5 is a perspective view of the selector fork associated with the assembly of the invention.

A gear segment 14 is arranged in a fixed manner on the selector fork 6—in the illustrative embodiment under consideration, the selector fork 6 and the gear segment 14 are embodied in one piece. The gear segment 14 has a second tooth system 13, which is likewise embodied as a spur gear tooth system (FIG. 5). The first tooth system 12 and the second tooth system 13 are in engagement with one another (FIG. 1, FIG. 4).

The sliding sleeve 7 is embodied in such a way that it can be moved axially and it is connected to the selector fork 6 to allow an adjusting action. The sliding sleeve 7 is embodied substantially in a ring shape and, on the inner circumference, has a circumferential internal tooth system 10 (FIG. 1, FIG. 4). Furthermore, the sliding sleeve 7 has, on the outer circumference, a circumferential ridge 16, in which the selector fork 6 directly engages (FIG. 1, FIG. 4). Sliding contacts are integrated into the selector fork 6 in the region of engagement with the sliding sleeve 7, to be more precise in the region of engagement with the ridge 16 of the sliding sleeve 7. In an alternative embodiment, it is also possible for the sliding sleeve 7 to be embodied with a circumferential groove instead of the ridge 16. The selector fork 6 then engages in the groove via pins or sliding blocks.

Figure 7:
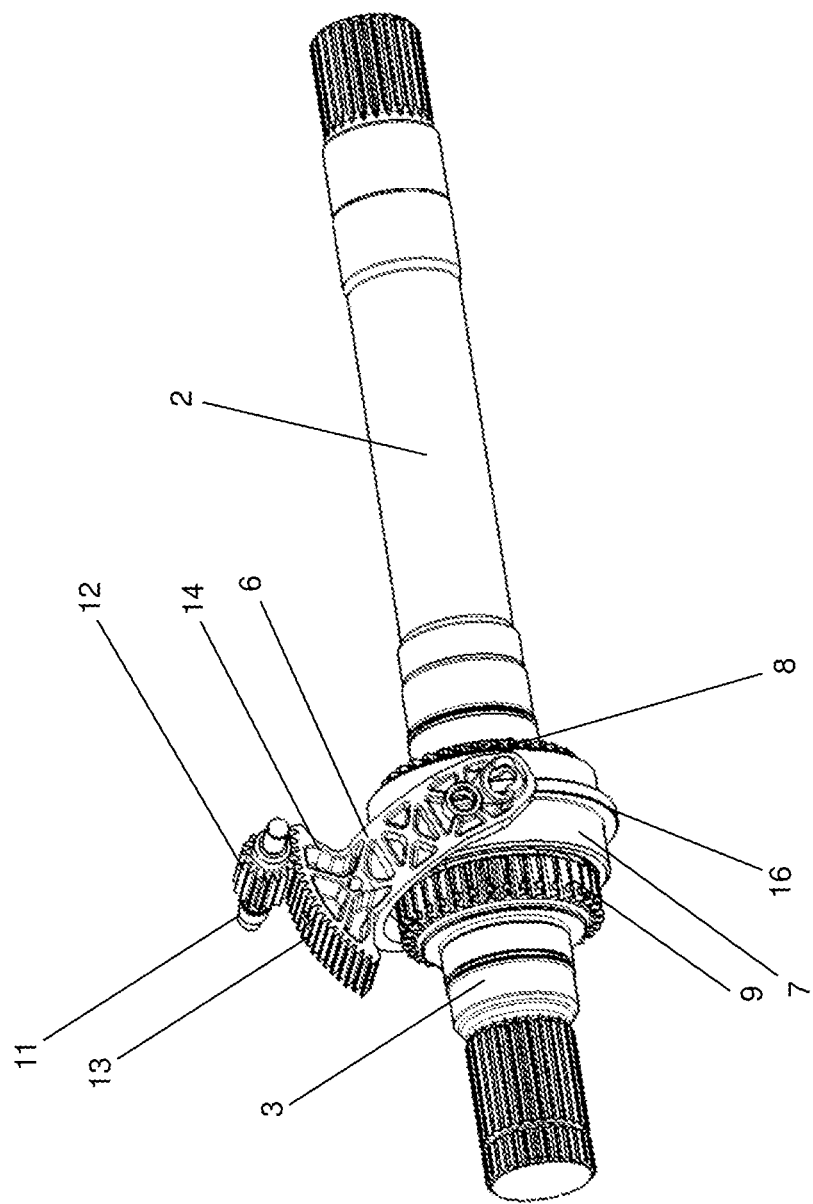
FIG. 7 is a perspective view showing the first shaft, the second shaft, the selector fork and the output shaft of the electric motor associated with the assembly shown in FIG. 1, wherein the first shaft and the second shaft are not connected to one another for a driving effect ("disconnect" mode).
Figure 8:
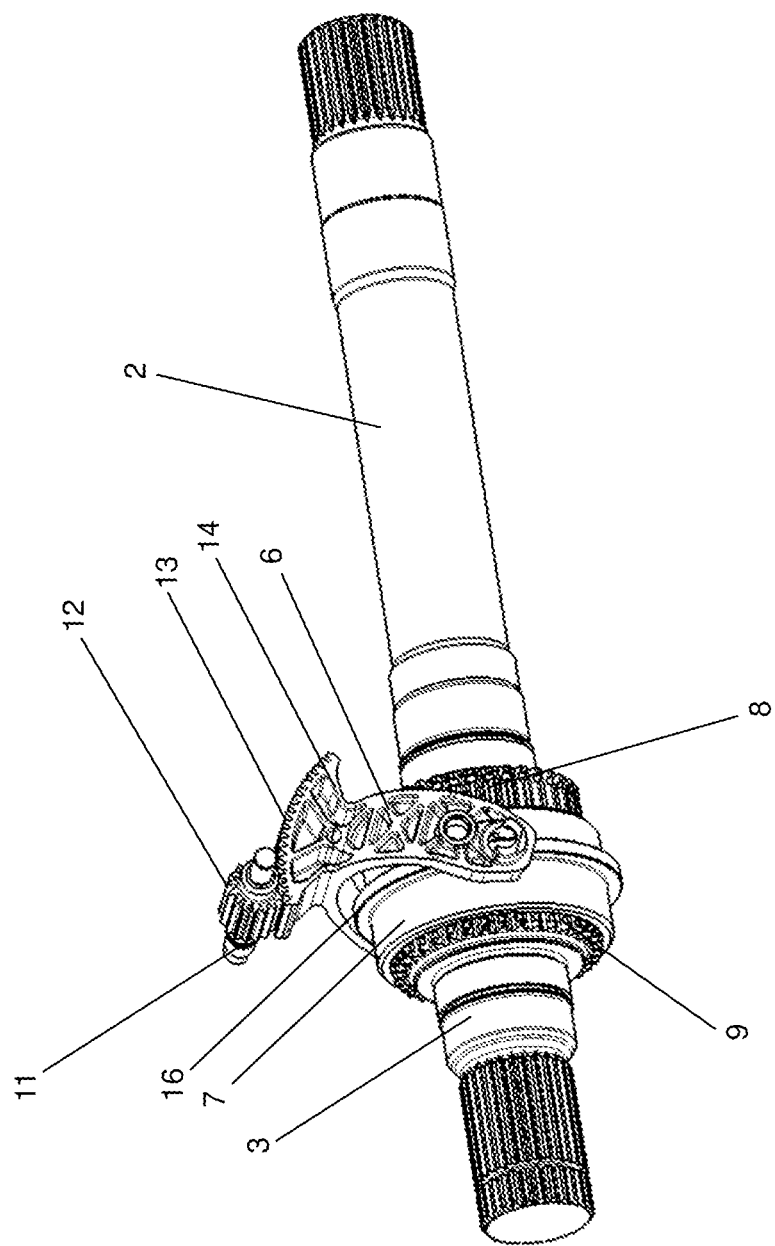
FIG. 8 is another perspective view of the first shaft, the second shaft, the selector fork and the output shaft of the electric motor associated with the assembly shown in FIG. 1, wherein the first shaft and the second shaft are connected to one another for a driving effect ("connect" mode).

The adjusting movement of the selector fork 6 for the adjustment of the sliding sleeve 7 is thus a pivoting movement, and the adjusting movement of the sliding sleeve 6 for the selective coupling of the first shaft 2 and the second shaft 3 is an axial movement (FIG. 7, FIG. 8).

Figure 3:
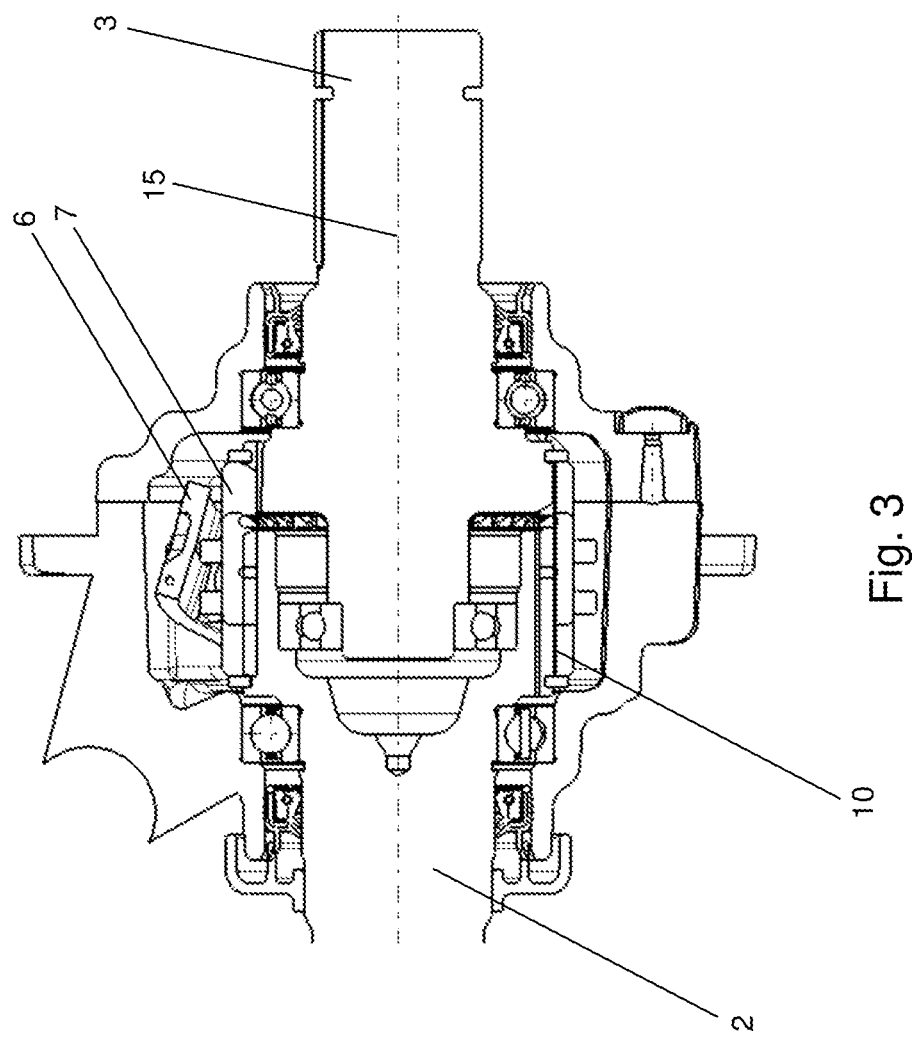
FIG. 3 is a partial sectional view of the assembly according to the invention shown in FIG. 1, in particular illustrating a first shaft, a second shaft and a selector fork.

The direction indication "axial" describes a direction along or parallel to an axis of rotation 15 of the two shafts 2, 3 (FIG. 3).

The direction indication "radial" describes a direction normal to the an axis of rotation 15 of the two shafts 2, 3 (FIG. 3).

The first shaft 2 has a circumferential first external tooth system 8 in a section at an end adjacent to the second shaft 3. The second shaft 3 has a circumferential second external tooth system 9 in a section at an end adjacent to the first shaft 2. The first external tooth system 8 is in engagement at all times with the internal tooth system 10 of the sliding sleeve 7, and the second external tooth system 9 can be brought into engagement with the internal tooth system 10 of the sliding sleeve 7 (FIG. 7, FIG. 8).

The sliding sleeve 7 can adopt two shift positions, namely a first shift position and a second shift position. In the first shift position of the sliding sleeve 7, the internal tooth system 10 of the sliding sleeve 7 is in engagement only with the first external tooth system 8 of the first shaft 2 (FIG. 7). This shift position describes a "disconnect" mode of the assembly 1. In the second shift position of the sliding sleeve 7, the internal tooth system 10 of the sliding sleeve 7 is in engagement with the first external tooth system 8 of the first shaft 2 and with the second external tooth system 9 of the second shaft 3 (FIG. 8). This shift position describes a "connect" mode of the assembly 1.

In the illustrative embodiment under consideration, the adjusting movement of the selector fork 6 for the adjustment of the sliding sleeve 7 is a pivoting movement, wherein the pivoting point of the selector fork 6 is radially above the axis of rotation 15 of the two shafts 2, 3.

It is also possible for the second external tooth system 9 on the second shaft 3 to be embodied with an undercut in order to prevent unwanted opening under load (torque), even without active activation of the electric motor 5. The region of the internal tooth system 10 of the sliding sleeve 7 which is in engagement with the second external tooth system 9 in the second shift position can also be embodied with an undercut.

What is claimed is:

1. An assembly for the selective coupling of two coaxially arranged shafts, comprising
   a first shaft and a second shaft, wherein the first shaft and the second shaft are arranged coaxially, and
   a selector unit for selectively coupling the first shaft to the second shaft, wherein the selector unit has an electric motor, a selector fork, and a sliding sleeve which is connected to the selector fork to allow an adjusting action,
wherein the first shaft has a first external tooth system and the second shaft has a second external tooth system, wherein the first external tooth system is in constant engagement with an internal tooth system of the sliding sleeve and the second external tooth system can be brought into engagement with the internal tooth system of the sliding sleeve, wherein an output shaft of the electric motor includes a first tooth system which is in engagement with a second tooth system of a gear segment, wherein the gear segment is arranged in a fixed manner on the selector fork, and wherein the first tooth system and the second tooth system are each designed as a spur gear tooth system.

2. The assembly according to claim 1, wherein the adjusting action allowed by the connection between the sliding sleeve and the selector fork is configured such that a pivoting movement of the selector fork causes an axial movement of the sliding sleeve for selectively coupling the first shaft to the second shaft.

3. The assembly according to claim 1, wherein the selector fork and/or the gear segment are/is manufactured from a metal.

4. The assembly according to claim 3, wherein the selector fork and/or the gear segment are/is manufactured from aluminium.

5. The assembly according to claim 1, wherein the selector fork and/or the gear segment are/is manufactured from a plastic or a composite material.

6. The assembly according to claim 1, wherein the selector fork and the gear segment are embodied in one piece.

7. The assembly according to claim 1, wherein the sliding sleeve is produced from a metal.

8. The assembly according to claim 7, wherein the sliding sleeve is produced from steel.

9. The assembly according to claim 2, wherein the pivoting movement of the selector fork is about a pivot point that is radially offset from an axis of rotation of the first and second shafts.

10. The assembly according to claim 1, wherein a transmission ratio established by way of the first tooth system and the second tooth system is configured in such a way that the output shaft of the electric motor performs a maximum of one revolution to pivot the selector fork and thus axially move the sliding sleeve.

11. The assembly according to claim 2, wherein selective actuation of the electric motor causes the output shaft to rotate such that the engagement between the first tooth system and the second tooth system causes the pivoting movement of the selector fork, wherein rotation of the output shaft in a first rotary direction causes the pivoting movement of the selector fork in a first pivot direction for axially moving the sliding sleeve from a first shift position to a second shift position, wherein subsequent rotation of the output shaft in a second rotary direction causes the pivoting movement of the selector fork in a second pivot direction for axially moving the sliding sleeve from the second shift position to the first shift position, wherein the sliding sleeve is operable in the first shift position to disengage the internal tooth system from the second external tooth system so as to disconnect the second shaft from the first shaft, and wherein the sliding sleeve is operable in the second shift position to engage the internal tooth system with the second external tooth system si as to connect the seocnd shaft to the first shaft.

12. The assembly according to claim 2, wherein the first tooth system includes a first spur gear mounted on the output shaft of the electric motor, wherein the second tooth system is a second spur gear mounted on the gear segment of the selector fork, and wherein the first spur gear is in constant meshed engagement with the second gear.

13. An assembly for selectively coupling and uncoupling a pair of coaxially arranged shafts, comprising:
   a first shaft arranged for rotation about a rotary axis and having a first external tooth system;
   a second shaft arranged coaxially relative to the first shaft for rotation about the rotary axis and having a second external tooth system; and
   a selector unit operable for selectively coupling and uncoupling the first and second shafts, the selector unit including an electric motor having an output shaft driving a first gear, a selector fork having a raised gear segment defining a second gear which is in constant meshed engagement with the first gear, and a sliding sleeve having an internal tooth system in constant meshed engagement with the first external tooth system on the first shaft and being operably connected to the selector fork to allow an adjusting action therebetween, wherein the sliding sleeve is axially moveable on the first shaft between a first shift position whereat the internal tooth system is disengaged from the second external tooth system for uncoupling the first and second shafts and a second shift position whereat the internal tooth system is engaged with the second external tooth system for coupling the first and second shafts, and wherein the adjusting action includes a pivoting movement of the selector fork between first and second pivot positions causing corresponding movement of the sliding sleeve between the first and second shift positions.

14. The assembly according to claim 13, wherein the pivoting movement of the selector fork is about a pivot axis that is radially offset from the rotary axis of the first and second shafts.

15. The assembly according to claim 13, wherein selective actuation of the electric motor causes the output shaft to rotate such that the engagement between the first gear and the second gear causes the pivoting movement of the selector fork, wherein rotation of the output shaft in a first rotary direction causes the pivoting movement of the selector fork in a first pivot direction from the first pivot position to the second pivot position for casing corresponding movement of the sliding sleeve from the first shift position to the second shift position, and wherein subsequent rotation of the output shaft in a second rotary direction causes the pivoting movement of the selector fork in a second pivot direction from the second pivot position to the first pivot position for causing axial movement of the sliding sleeve from the second shift position to the first shift position.

16. The assembly according to claim 15, wherein a transmission ratio established between the first gear and the second gear is selected such that the output shaft of the electric motor performs a single revolution for causing pivoting movement of the selector fork between the first and second pivot positions.

17. The assembly according to claim 13, wherein the raised gear segment and the selector sleeve are embodied in a single component.

* * * * *